(No Model.)
E. JARRELL.
TORSION SPRING FOR VEHICLES.
No. 417,041. Patented Dec. 10, 1889.
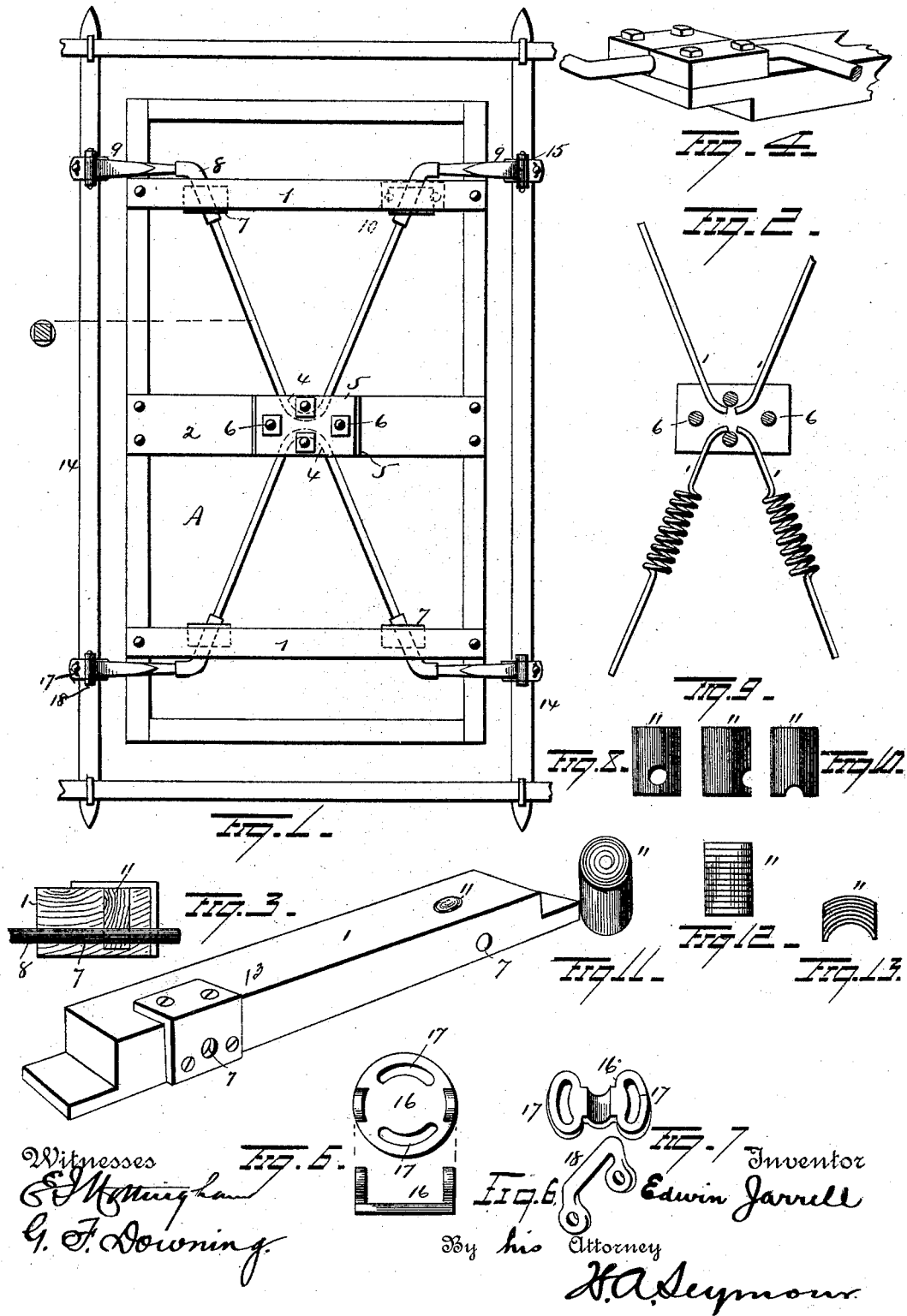
Witnesses
E. J. Nottingham
G. F. Downing
Inventor
Edwin Jarrell
By his Attorney
H. A. Seymour

UNITED STATES PATENT OFFICE.

EDWIN JARRELL, OF HARPER, KANSAS, ASSIGNOR OF ONE-HALF TO JAMES W. McMUNN AND HARRY W. McMUNN, BOTH OF SAME PLACE.

TORSION-SPRING FOR VEHICLES.

SPECIFICATION forming part of Letters Patent No. 417,041, dated December 10, 1889.

Application filed October 4, 1889. Serial No. 325,985. (No model.)

*To all whom it may concern:*

Be it known that I, EDWIN JARRELL, a resident of Harper, in the county of Harper and State of Kansas, have invented certain new and useful Improvements in Torsional Springs for Vehicles; and I do hereby declare the following to be a full, clear, and exact description of the invention, such as will enable others skilled in the art to which it appertains to make and use the same.

My invention relates to an improvement in torsional springs for vehicles, the primary object being to provide a durable and yielding spring which shall be productive of ease and comfort to the occupant of the vehicle.

Other objects are to provide a light and simple spring capable of application to most any vehicle and one which may be placed on the market at a slight cost; to provide a spring free of all noise and which will equalize weight and strain and relieve horse motion; and, further, to provide for the easy adjustment of the springs and to insure the self-oiling of the journals, thus dispensing with the usual squeaking noise attending the use of many vehicles.

With these ends in view my invention consists in certain novel features of construction and combinations of parts, as will be hereinafter described, and pointed out in the claims.

In the accompanying drawings, Figure 1 is a bottom plan view of the vehicle-body with one form of spring attached. Fig. 2 is a similar view of a slightly-modified form. Fig. 3 is an enlarged detached view of one of the cross-bars. Fig. 4 is a modification. Fig. 5 is a view of the shackle. Figs. 6 and 7 are modifications, and Figs. 8, 9, 10, 11, 12, and 13 show different forms of oiling-plugs.

A represents the wagon-box, and 1 1 are a pair of end cross-bars bolted or otherwise secured on the lower side of the bottom of the box, and 2 is a center cross-bar located between the end cross-bars.

A pair of spring-bars, preferably square or angular in section, are bent substantially into V shape and so placed that the bends 4 4 formed in them come together, or nearly so, where they are clamped securely by means of plates 5 5, which are held on each side of the bars and to the center cross-bar 2 by bolts, screws, or other means 6 6, while their outer ends pass loosely through journal-boxes 7 7, formed for them in the end cross-bars 1 1. To admit of the free torsional action of these bars, and also give increased strength at a point where it is essential, a round sleeve 8 is formed at the points where the bars extend through the journals. Just beyond these points the bars are bent outward to form the arms 9 9, upon which the body is supported. These arms may be variously bent, but preferably extend out at right angles to the box.

The journals in the cross-bars, through which the spring-bars pass, may be variously formed. For instance, they may be entirely within the cross-bars or in their edges, where they are held by plates 10 10; but an essential feature of my invention consists in the self-oiling plugs 11. Different forms of these plugs are shown in Figs. 8, 9, 10, 11, 12, and 13, and the material used may be wood, leather, rubber, gutta-percha, horn, or metal. These plugs are made self-oiling by boiling or soaking them in oil, tallow, gum-arabic, beeswax, or the like. This not only makes them durable, but also makes them self-oiling as long as the vehicle lasts and constantly supplies the journal with sufficient lubricant to prevent wear and noise.

The self-oiling journal is made by passing the spring through the plug, as shown in Fig. 8, through its edge, as shown in Fig. 9, or through its end, as shown in Fig. 10; or, as shown in Fig. 11, sheets of metal, leather, or rubber belting may be rolled together to form a plug; or they may be in round sections or washers, as in Fig. 12, and these washers may be bent around the spring, as shown in Fig. 13. When in this form, they may be held in place by means of a pin driven back of them, and the pin, the same as the plugs, is held in place by a thin angle-plate 13, which laps over and is secured to two edges of the cross-bars.

In using wood plugs all the friction is on the end of the grain, both in the end of the plug and cross-bar.

The outwardly-projecting arms of the springs, as above described, are supported on the side bars 14 14 by the shackles 15 15. These are made in different forms, as shown in Figs. 5, 6, and 7, and consist of the plate 16, having diametrically-located slots 17 17, by means of which the plates are adjustably secured to the side bars at different angles to suit the position of the arms 9 9. A swinging knuckle is loosely supported on the plate and a bolt 18, passing through the knuckle, connects the ends of the arms. By means of these forms of shackles the arms are easily fastened to the side bars of the vehicle whatever position they may assume.

In Fig. 2 the bars 1 1, constituting the springs, are separated at the center into four parts or sections, which admit of their being adjusted laterally in the clamps, the object being to equalize strain. It is with this particular construction of spring that the adjustable shackles are rendered of importance, as the adjustment of the springs laterally makes the ends of the arms 9 9 take different positions relative to the side bars. The adjustability of shackles admits of this, and also by the use of them the angle formed in the bars composing the springs may be an acute, right, or obtuse angle. Another difference consists in the spirals 19·19 in the rear sections of the springs, which add to the elasticity of the springs and allow me to employ longer spring-bars in front for the purpose of making a slow-motion spring.

In Fig. 4 the spring-bars extend straight out of the end bars and the arms 9 9 extend forward and backward at right angles and are adapted for support on the front bar and axle of the vehicle.

These springs may be applied to other than four-wheeled vehicles, and it is evident that slight changes might be made in the form and arrangement of the several parts described without departing from the spirit and scope of my invention, and hence I do not wish to limit myself to the particular construction herein set forth; but, Having fully described my invention, what I claim as new, and desire to secure by Letters Patent, is—

1. In a vehicle, the combination, with a body having bearings on the under side thereof and supports for the body, of torsional springs each rigidly secured to the body and passing through its respective bearing and secured at its outer end to the supports for the body, and plugs saturated with a lubricant for lubricating the springs at the bearings, substantially as set forth.

2. The combination, with a vehicle box or body, of torsion-springs secured to the box or body and shackles for attaching the springs to the side or end bars of the running-gear, the said shackles having curved slots, substantially as set forth.

3. The combination, with a box and frame, of torsion-springs secured to the box at one end and extending loosely through bearings at the opposite end and shackles for connecting the springs to the frame, the said shackles having curved slots to enable them to be turned or adjusted to receive the ends of the torsion-springs, substantially as set forth.

4. The combination, with a box and frame, of torsion spring-bars clamped at one end to the box and extending through self-oiling journals at the opposite ends, and adjustable shackles consisting of slotted plates, swinging knuckles, and bolts, substantially as set forth.

5. The combination, with a box, end and center cross-bars secured thereto, and vehicle-frame, of a pair of substantially-V-shaped torsion spring-bars, clamps for holding these bars to the center cross-bar of the box, self-oiling journals carried by the box, through which the springs pass, and adjustable shackles for connecting the springs to the frame, substantially as set forth.

6. The combination, with a box, end and center cross-bars secured thereto, and vehicle-frame, of adjustable sectional torsion-springs, clamps for adjustably securing them at one end to the center cross-bar, journals in the end cross-bars, through which the springs pass, and shackles connected to the extreme outer ends of the springs for securing them to the side or end bars of the running-gear, substantially as set forth.

In testimony whereof I have signed this specification in the presence of two subscribing witnesses.

EDWIN JARRELL.

Witnesses:
J. A. TRICKETT,
J. W. McMUNN.